March 1, 1932. R. C. POLLOCK 1,847,413
PROCESS FOR DEHYDRATING EMULSIFIED OILS
Filed July 12, 1923 3 Sheets-Sheet 1
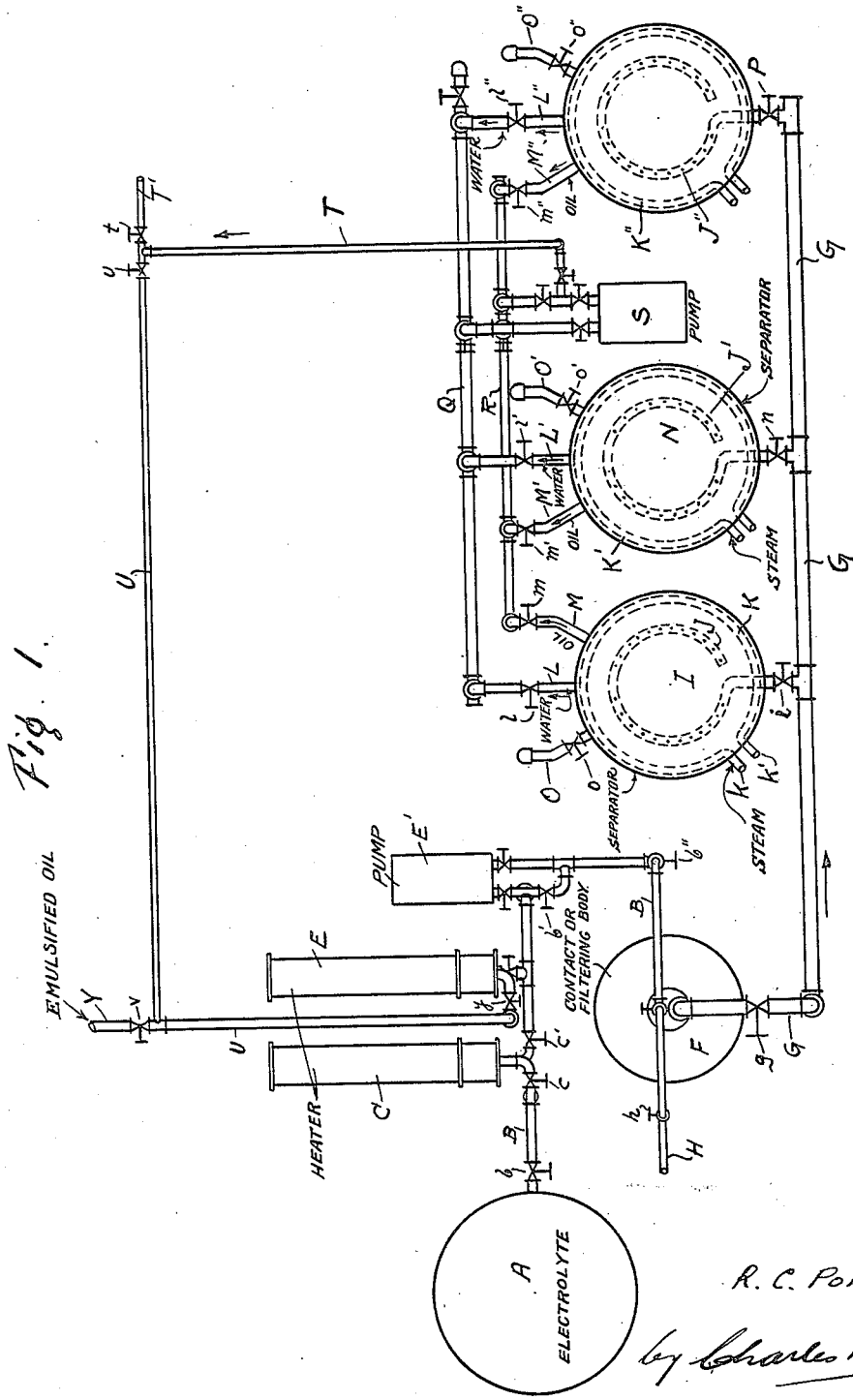
Inventor
R. C. Pollock
by Charles L. Stone
Attorney

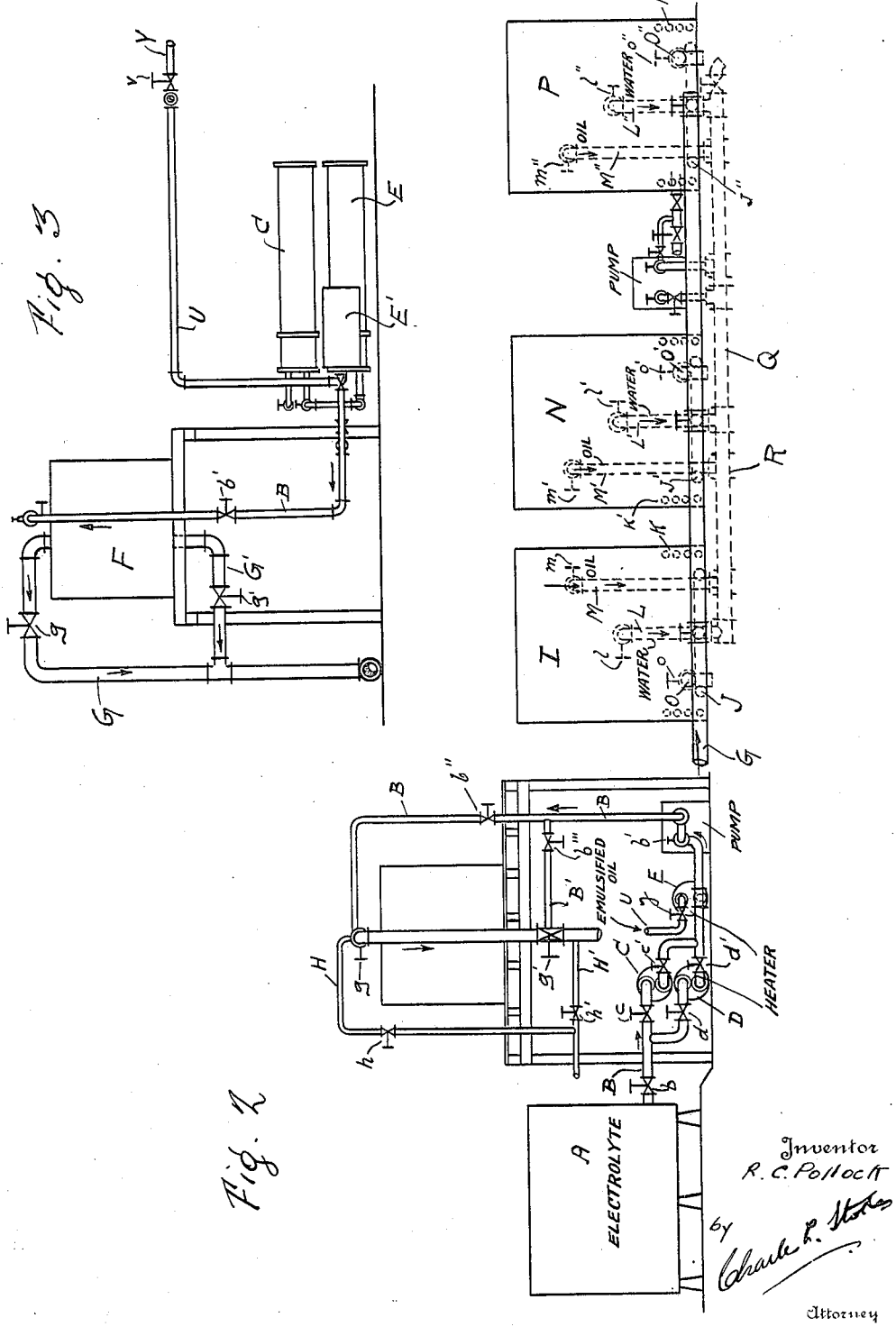

March 1, 1932. R. C. POLLOCK 1,847,413
PROCESS FOR DEHYDRATING EMULSIFIED OILS
Filed July 12, 1923   3 Sheets-Sheet 3

Inventor
R. C. Pollock
By Charles L. Stokes
Attorney

Patented Mar. 1, 1932

1,847,413

UNITED STATES PATENT OFFICE

RALPH C. POLLOCK, OF LONG BEACH, CALIFORNIA, ASSIGNOR TO UNION OIL COMPANY OF CALIFORNIA, OF LOS ANGELES, CALIFORNIA, A CORPORATION OF CALIFORNIA

PROCESS FOR DEHYDRATING EMULSIFIED OILS

Application filed July 12, 1923. Serial No. 651,120.

My invention relates to methods of treating emulsified petroleum oils for the purpose of deriving therefrom a substantially water free oil.

In the petroleum industry, emulsified oils are produced in great quantities under many conditions, the principal source being wells from which oils, containing varying percentages of water, are primarily obtained.

Other sources of supply for emulsified oils are the oil refineries and tank farms, where such emulsions are formed under various conditions.

The emulsified petroleum oils referred to are practically all of the type in which the water is the dispersed, or internal, phase; that is to say, the water is held in the oil as in an envelope, such envelope being composed of a portion of the oil which is the emulsifying agent, the surface tension of which is greater towards water than towards the oil, therefore it tends to occlude, or envelop, droplets of water.

Many theories are offered as to the formation of petroleum emulsions, but it appears that such emulsions are principally due to an emulsifying agent which, in the case of the petroleum emulsions under consideration wherein water is the dispersed phase and oil is the continuous phase, is generally a hydrophobe colloid, or a colloid which is more easily wetted by oil than by water.

Other emulsions are also dealt with in which opposite conditions prevail, that is the oil is dispersed in the water, which thus forms the continuous phase. In this case it is found that the emulsifying agent is a hydrophile colloid, or a colloid which is more easily wetted by water than by oil.

In either case, the dispersed phase is held tenaciously in the continuous phase in droplets varying in size from microscopic to macroscopic and it is necessary to rupture the envelope of emulsifying colloid in order to permit the agglomeration of the dispersed phase for its ready separation from the continuous phase.

It would appear that the simplest way to break the enveloping film of the emulsifying colloids, in separating water from emulsified petroleum oils, is to expose such oils to the action of electrolytes in which the more strongly adsorbed ion carries a charge opposite to that of the emulsifying agent, but other methods may be used depending on the conditions encountered, such as adding a colloid of the same type as the emulsifying agent but carrying an electrical charge of opposite sign, or by the addition of a colloid carrying the same charge but of a different type; for instance a negatively charged hydrophile colloid will break emulsions wherein the emulsifying agent is a negatively charged hydrophobe colloid.

I have isolated such emulsifying agents from California emulsified oils, particularly the oils obtained in the Santa Maria field, and find such to be a material formed from asphaltenes which, when wetted by oil, forms a colloid which is the cause of emulsions from that field. While such emulsified crude oils also contain sand and other finely divided mineral matter, such are not the source of the emulsion forming colloids, the same often being easily removed by filtration, or settling, without affecting the stability of the emulsions.

For the purpose of treating emulsified oils for market or refinery purposes, it is necessary to remove the water therefrom until the remaining oil contains water in very small percentages. For instance, for pipe line conditions, the water left in the oil must not be over 2% by volume and in many cases it is necessary to lower the water content to a fraction of one per cent. Oils containing large percentages of water are practically valueless and the water must be reduced in content to obtain the values from the oils, many processes being in use therefor, but known processes have many losses and disadvantages which are now overcome by my invention.

The water content, or dispersed phase of the emulsified oils referred to, is generally of a saline nature, containing soluble salts such as sodium chloride, the percentage of which varies largely in different localities and I have discovered that by contacting the emulsified oils with an excess of the dispersed phase containing an electrolyte, the separation of water is rapidly and economically accomplished even with the most refractory emulsions.

In order to accomplish a contact process for exposing the emulsified oils continuously to an excess of the dispersed phase in finely divided streams, or film form, wherein the emulsified oils are also subjected to the influence of an electrolyte for negativing the colloidal actions of the emulsifying agent, the steps of the process are illustrated in the drawings in which Fig. 1 is a plan view of suitable apparatus for my process;

Fig. 2 is a front elevation, partly in section;

Fig. 3 is a section taken at right angles to Fig. 1;

Figure 4:
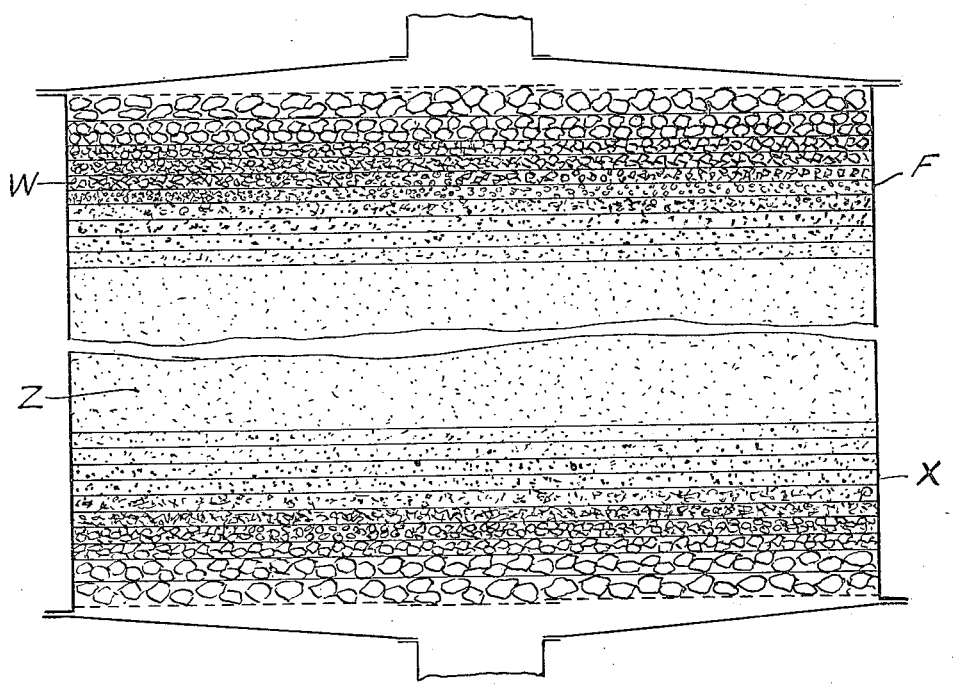
Fig. 4 is a sectional detail of part of the apparatus.

Tank A contains an electrolyte, such preferably being a solution containing a percentage of hygroscopic salts; for instance sea water containing magnesium and sodium chlorides may be used to advantage on account of its cost and accessibility in many localities. Many other salts may be also used in solution, the principal object being to obtain an electrolyte in which the ions may be of sufficient potential to neutralize the charge on the colloidal emulsifying agent brought in contact therewith, to the end that water enclosed in the emulsifying agent may be freed therefrom and then agglomerates.

Pipe B, controlled by a valve $b$, leads from A to a heater C, which may be heated to a desired temperature in any suitable manner and the electrolyte is drawn from A through B and C by the suction of a pump E' which forces the same through a continuation of B to the upper end of a chamber F containing a contact material.

F is a chamber preferably arranged to hold a medium for giving a large ratio of surface to volume for liquids passed therethrough, and I find that sand of varying diameters arranged in layers graded from coarse to fine from the upper and lower ends towards the middle is quite suited to my purpose. F is thus shown to contain a graded section W at the upper end and a similarly graded layer X at the lower end and a central portion Z consisting of a comparatively thick layer of the finest graded sand.

The sand in F being thoroughly wetted by the electrolyte forced therethrough by pump E' and its temperature raised to that desired for the emulsified oils to be treated, the supply of electrolyte is cut off by closing valves $c$ and $c'$, and it may be here noted that at times it is desirable to use a large volume of heated electrolyte suddenly when cleaning the sand in F as will be later described, therefore two heaters C and D are provided in order to supply continuously a sufficient quantity of heated electrolyte. The lower heater D is controlled by valves $d$ and $d'$ and valves $c$, $c'$, $d$ and $d'$ being closed emulsified oils are drawn from a source of supply to the pump E' through pipes Y and U controlled respectively by valves $v$ and $y$ and on their passage to the pump are bypassed through a heater E wherein their temperature is raised, in the case of emulsified oils from the Santa Maria field in California, to 160 degrees Fahrenheit, this temperature being approximately the same to which the sand in F has already been raised by the passage of heated electrolyte therethrough. In the treatment of emulsified oils generally, I have found a temperature range of from 120 to 200 degrees Fahrenheit to be sufficient.

The emulsified oils are then forced by E', through a continuation of B to the upper end of F, valves $b'$ and $b''$ controlling the passage thereof, and come into contact with a large surface of sand in F which is wetted with an excess of the dispersed phase. The initial pressure for forcing the emulsified oils, when heated, through F is generally about 50 pounds, but as the action of the electrolyte on the sand in F decreases according to the volume of emulsion passed in contact therewith, the pump pressure may gradually be raised to about 100 pounds, principally because some of the colloidal emulsifying agent is deposited in the form of slime on the sand when freed of its water content through the action of the electrolyte and thus checks the passage of the emulsified oils.

The effect of the excess of the dispersed phase, in the form of an electrolyte, upon the emulsified oil passed in contact therewith is to rupture positively the water containing envelopes of emulsifying agent so that both water, oils and emulsifying agent pass through the sand in F and proceed through a pipe G', controlled by a valve $g'$, from the lower part of F to a pipe G of large diameter as compared with B.

G carries the mixture described, in as direct a manner as possible to the bottom of a separating tank I, which is heated by a closed steam coil K having an inlet $k$ and an outlet $k'$ to a temperature of about 140 degrees Fahrenheit, and is discharged into I through a pipe J which is suitably perforated to distribute the mixture of water, oils and emulsifying agent upwardly through a body of salt water, or excess of the dispersed phase, of similar character to the salt water in A.

Pipe G is made of comparatively large diameter as compared with B in order to reduce the velocity of flow of the emulsified oils after their contact with the electrolyte in F so that there will be no agitation in G such as might cause reemulsification, and reemulsification in I is further guarded against in maintaining the separation of the water from the oils and emulsifying agent by the passage of water, oils and emulsifying agent in fine streams up through a body of electrolyte from the perforations in J. The water from the emulsified oils thus coalesces with the electrolyte in I and may be drawn therefrom through a pipe L, controlled by a valve $l$. The finished, or dehydrated oil, is drawn off at a higher level through a pipe M controlled by a valve $m$.

In this manner I have successfully removed the water from a refractory emulsified oil containing 45% water and reduced the water content to below 2%, by contacting the emulsified oils over a large surface with an excess of the dispersed phase, such as sea water which may be made a substantially saturated sodium chloride solution by the further addition of salt, but in general I may use any electrolyte which, on solution, yields a strongly adsorbed negative ion. The percent saturation of such sodium chloride solution may vary considerably in order to obtain the maximum separation from different emulsified oils but the separation is most accelerated by using a strong salt solution when the water contained in the emulsified oils is weakly saline and on the contrary a weaker salt solution may be used to advantage when the water contained in the emulsified oils is strongly saline.

At times in place of using sand in F and wetting the same with a salt solution of the character described, particularly in such localities where crude salt may be obtained at nominal cost, I have replaced the sand in F with crude salt of varying grades of fineness to the end that the same results are obtained, viz. the emulsified oils are readily separated into their constituent parts and the valuable parts recovered therefrom.

In order to make the process continuous without serious delay, which might make the process economically inoperative, F is so arranged that when the electrolyte contained on the sand therein has lost its de-emulsifying power and the sand has become coated with the colloidal slime of the emulsifying agent, the supply of emulsified oils through B to the upper end of F is cut off by closing valve $y$ and opening valves $c$ and $c'$, or valves $d$ and $d'$, or all four valves may be opened at the same time if the conditions warrant, valve $g$ is closed and valve $g'$ is opened to the end that a volume of heated electrolyte is forced through the sand in F thereby cleaning out any oil contained therein.

The oil thus removed is of the same grade as that treated in the first instance and it is therefore collected in the regular separating tank I and having removed most of the oil from the sand in F, valves $g$ and $b''$ are closed and valves $g'$ and $b'''$ are opened in order to cause a reverse flow of electrolyte upwardly through F, the electrolyte being diverted to the lower end of F through the pipe B'.

At the same time valves $i$ and $n$ are closed so that the electrolyte and oil pass directly to a slop oil tank P, which has similar heating and separating connections to those already described for tank I, consisting of a closed steam coil K'' and a distributing discharge pipe J'' controlled by a valve $p$, an oil draw off M'' controlled by a valve $m''$, a water draw off L'' controlled by a valve $l''$, and a drain pipe O'' controlled by a valve $o''$. Such oil as is collected by separation in P may be drawn through R by the pump S and forced later through T and U to F, wherein it is retreated as already described.

The action of reversing the flow of electrolyte through F is for the purpose of somewhat agitating the sand contained therein, thus opening the interstices thereof for better adsorbing a fresh supply of electrolyte and at the same time to complete the removal of any further colloidal slime held in, or on, the sand.

The action of the electrolyte, for cleaning the surfaces of the sand particles in F, is accelerated by the use of compressed air, which may be supplied to the upper and lower ends of F, according to the direction of flow of electrolyte, through pipes H controlled by valve $h$ and H' controlled by valve $h'$ respectively.

After the sand in F is thoroughly washed by reversing the flow of electrolyte as described, the supply of electrolyte through C and/or D is cut off and a new supply of emulsified oils from E and E' is forced through F under similar conditions of temperature and pressure as before mentioned. At times it is desirable to divert the flow of treated emulsified oils from I to a tank N, which is provided with similar instrumentalities for receiving mixtures of fluids from G through a valve $n$, whence they are discharged from a perforated pipe J' upwardly through a body of electrolyte contained therein. N is heated by a closed steam coil K' and has an oil draw off M' controlled by a valve $m'$, a water draw off L' controlled by a valve $l'$, and a drain pipe O' controlled by a valve $o'$. It may be here noted that the temperatures of the mixtures in N and P are maintained at about 140 degrees Fahrenheit.

At times the action of an excess of the dispersed phase on the emulsified oils being treated is accelerated by passing part of the electrolyte through F along with the emulsified oils. This is accomplished by so regulating valves $c$, $c'$, $d$, $d'$, and $y$ that the pump E' draws a mixture of electrolyte and emulsified oils, of desired proportions, thereto and forces the same through the contact medium in F.

In this manner I am able to continuously treat emulsified oils for the economical and efficient separation therefrom of the tenaciously held water particles and in so doing it may be noted that there is no loss of any of the lighter fractions of the oils from evaporation, the same being conserved in the body of the recovered water free oils, and further, danger from fire is eliminated.

I claim:

1. The process of treating emulsified oils, which comprises passing the emulsified oils in contact with a salt solution carrying readily adsorbed negative ions for reacting with the emulsifying agent through a porous filtering medium composed of solid particles.

2. The process of treating emulsified oils containing water held in the oils as the dispersed phase, which consists in passing the emulsified oils in contact with an excess of the dispersed phase contained between the interstices of sand for separating the water from the emulsifying agent, and then segregating the water from the oils and emulsifying agent.

3. The process of treating emulsified oils containing oils, water and an emulsifying agent wherein the water is held by the emulsifying agent as the dispersed phase, which consists in passing the emulsified oils in contact with an excess of the dispersed phase contained between the interstices of increasingly fine layers of solid particles for separating the water from the emulsifying agent, and then segregating the water from the oils and emulsifying agent by further passage of the water, oils and emulsifying agent through a further excess of the dispersed phase.

4. The process of treating emulsified oils containing oils, water and an emulsifying agent wherein the water is held by the emulsifying agent in the oils as the dispersed phase, which consists in moistening a bed of sand with an excess of water containing salts that readily ionize and then forcing the emulsified oils through the sand bed so as to contact with the excess of ionized salt solution.

5. The process of treating emulsified oils containing oils, water and an emulsifying agent wherein the water is held by the emulsifying agent in the oils as the dispersed phase, which consists in providing a compact mass of small grains of solid matter and in alternately passing water containing in solution a highly ionized salt and the emulsified oils thru the compact mass.

6. A process of de-emulsifying oil and water emulsion which comprises passing the emulsion in the presence of an electrolyte other than the water of the emulsion through a porous filtering medium composed of solid particles and separating the phases of the emulsion.

7. In a process of de-emulsifying oil and water emulsion the steps which comprise passing oil through a porous filtering medium composed of solid particles and subsequently passing an electrolyte other than the water of the emulsion in partially emulsified condition with the oil through said filtering medium.

8. Process of de-emulsifying oil and water emulsion which comprises establishing contact of an emulsion with solid particles which have been previously contacted with a de-emulsfying agent in solution other than the water of the emulsion in partially emulsified condition with the oil.

9. A process of de-emulsifying oil and water emulsion which comprises contacting an emulsion with solid particles in the presence of a solution of de-emulsifying agent other than the water of the emulsion in partially emulsified condition with the oil.

10. A process of de-emulsifying oil and water emulsion which comprises passing an emulsion in the presence of a solution of de-emulsifying agent other than the water of the emulsion in partially emulsified condition with the oil in contact with solid particles arranged in a filtering body.

11. A process of de-emulsifying oil and water emulsion which comprises contacting the emulsion with solid particles and a dissolved de-emulsifying agent other than the water of the emulsion in partially emulsified condition with the oil.

12. A process of de-emulsifying oil and water emulsion which comprises contacting solid particles with a de-emulsifying agent in solution other than the water of the emulsion in partially emulsified condition with the oil and passing the emulsion in contact with said particles.

13. A process of de-emulsifying oil and water emulsion which comprises passing an emulsion in the presence of a solution of de-emulsifying agent other than the water of the emulsion in partially emulsified condition with the oil through a granular filtering medium.

14. A process of de-emulsifying oil and water emulsion which comprises wetting solid particles with a de-emulsifying agent other than the water of the emulsion in partially emulsified condition with the oil and contacting the emulsion with wetted particles.

15. A process of de-emulsifying oil and water emulsion which comprises contacting the emulsion with solid particles wetted with a de-emulsifying agent other than the water of the emulsion in partially emulsified condition with the oil.

16. A process of de-emulsifying oil and water emulsion which comprises filtering the oil emulsion through a mass of small particles wetted by a de-emulsifying agent other than the water of the emulsion in partially emulsified condition with the oil.

17. A process of de-emulsifying oil and water emulsion which comprises filtering the oil emulsion through a mass of small particles in the presence of a de-emulsifying agent in solution other than the water of the emulsion in partially emulsified condition with the oil.

18. The process of treating emulsified oil and water which comprises passing the emulsified oil in contact with an electrolyte other than the water of the emulsion in partially emulsified condition with the oil, in finely divided form, through a porous filtering medium composed of solid particles and then separating the water from the oil.

19. A process of de-emulsifying oil and water emulsion which comprises contacting the emulsion with solid particles and a solution of de-emulsifying agent other than the water of the emulsion in partially emulsified condition with the oil, and separating the oil from said particles.

20. A method of resolving water and oil emulsions which comprises contacting the emulsion with a de-emulsification agent, resolving said emulsion, separating the water and oil and treating new emulsion with the separated water.

Signed at Beaumont, in the county of Jefferson, and State of Texas, this 26th day of June A. D. 1923.

RALPH C. POLLOCK.